(12) United States Patent
Romero et al.

(10) Patent No.: US 10,724,970 B2
(45) Date of Patent: Jul. 28, 2020

(54) NON-DESTRUCTIVE INSPECTION METHOD AND SYSTEM CARRIED OUT ON AN AERONAUTICAL PART

(71) Applicant: SAFRAN, Paris (FR)

(72) Inventors: Edward Romero, Moissy-Cramayel (FR); Clement Remacha, Moissy-Cramayel (FR); Maximilian Melissas, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 16/329,968

(22) PCT Filed: Aug. 31, 2017

(86) PCT No.: PCT/FR2017/052313
§ 371 (c)(1),
(2) Date: Mar. 1, 2019

(87) PCT Pub. No.: WO2018/042132
PCT Pub. Date: Mar. 8, 2018

(65) Prior Publication Data
US 2019/0204241 A1 Jul. 4, 2019

(30) Foreign Application Priority Data
Sep. 2, 2016 (FR) ...................... 16 58197

(51) Int. Cl.
*B64F 5/60* (2017.01)
*G01N 23/04* (2018.01)

(52) U.S. Cl.
CPC ............... *G01N 23/04* (2013.01); *B64F 5/60* (2017.01)

(58) Field of Classification Search
CPC .................................. B64F 5/60; G01N 23/04
See application file for complete search history.

(56) References Cited

U.S. PATENT DOCUMENTS

| 2004/0066908 | A1 | 4/2004 | Hanke et al. |
| 2007/0076842 | A1 | 4/2007 | Tkaczyk et al. |

FOREIGN PATENT DOCUMENTS

| DE | 10 2014 008 671 A1 | 12/2015 |
| WO | WO 02/31767 A2 | 4/2002 |

OTHER PUBLICATIONS

International Search Report dated Oct. 30, 2017 in PCT/FR2017/052313 filed Aug. 321, 2017.

(Continued)

*Primary Examiner* — Mark R Gaworecki
(74) *Attorney, Agent, or Firm* — Oblon, McClelland, Maier & Neustadt, L.L.P.

(57) ABSTRACT

The method of non-destructive inspection is carried out on an aviation part by a digital imaging system including a source of electromagnetic rays and a detector, and the method includes a prior step of estimating settings for the digital imaging system, which step includes: obtaining a digital model characterizing the digital imaging system and including models characterizing the source and the detector; obtaining a digital model characterizing the aviation part; evaluating a contrast-to-noise ratio for the digital imaging system and the aviation part for a plurality of distinct values of the settings, by making use of the digital models that have been obtained characterizing the digital imaging system and the aviation part; and determining optimum values for the settings that optimize the contrast-to-noise ratio and that are applied to the digital imaging system during a setting up step.

15 Claims, 4 Drawing Sheets

(56) References Cited

OTHER PUBLICATIONS

Tigkos, K. et al., "Simulation study for optimization of X-ray inspection setup applied to CFRP aerostructures," iCT Conference 2014, Feb. 28, 2014, pp. 75-85, XP055363187.

NON-DESTRUCTIVE INSPECTION METHOD AND SYSTEM CARRIED OUT ON AN AERONAUTICAL PART

BACKGROUND OF THE INVENTION

The invention relates to the general field of aviation.

It relates more particularly to non-destructive inspection of aviation parts, such as parts for aeroengines, e.g. such as high pressure or low pressure turbine blades, nozzles, etc. Nevertheless, no limitation is associated with the type of aviation part under consideration, nor with the material out of which the part is made. By way of example, the material may optionally be a composite material.

In known manner, the term "non-destructive inspection" is used to designate a set of methods that make it possible to characterize the state of the integrity and/or the quality of structures or of materials without degrading them. Non-destructive inspection has a preferred but non-limiting application in the field of aviation, and more generally it is applicable in any field in which the structures for which it is desired to characterize their state and/or their quality are expensive and/or in which it is critical that those structures operate reliably. Non-destructive inspection may advantageously be performed on the structure or the material under consideration both during production and also during use or maintenance.

Among existing methods of non-destructive inspection, some rely on digital images provided by digital tomography or X-ray systems. The advantage of such images is that they provide directly-usable information about the insides of structures or materials, and thus make it possible to detect internal defects that might affect those structures or those materials, e.g. such as the presence of inclusions or of cavities due to shrinkage. In the description below, the term "part" is used more generally to designate the structure or the material on which non-destructive inspection is to be performed.

Numerous variables are involved in setting up the above-mentioned digital imaging systems in order to acquire digital images of parts that are to be subjected to non-destructive inspection. Such variables include in particular the magnification, the time the part is exposed to electromagnetic rays (e.g. X-rays), pixel size, the quantum detection efficiency of the sensor forming part of the digital imaging system, etc. Nowadays, these settings are defined and validated for various measurement ranges by certification committees known (in France) as COSAC 2 and COSAC 3 (COmité Sectoriel Aérospatial de Certification [Aerospace Sector Certification Committee]). They rely to a very large extent on the experience of the professionals who manipulate digital imaging systems and on image quality indicators (IQIs) or factors being measured over a wide range of conditions on digital images in two or three dimensions that have been obtained from the digital imaging systems under consideration. Thus, at present, "manual" optimization of the settings of digital imaging systems such as tomographic or X-ray systems implies a considerable amount of work and time, and is to a large extent dependent on the ability of the person doing the optimization.

OBJECT AND SUMMARY OF THE INVENTION

The present invention serves in particular to remedy those drawbacks by proposing a method of non-destructively testing an aviation part, the method comprising:

- a setting step for setting up a digital imaging system, said digital imaging system being a digital tomography or X-ray system having a source of electromagnetic rays and a detector suitable for detecting the electromagnetic rays emitted by the source;
- an acquisition step for acquiring at least one digital image of the aviation part by means of the digital tomography or X-ray system as set up; and
- an inspection step for non-destructively inspecting the aviation part by using said at least one acquired digital image.

This non-destructive testing method is remarkable in that it further comprises a prior estimation step for estimating settings for the digital imaging system, this estimation step comprising:

- an obtaining step for obtaining a digital model characterizing the digital imaging system, said digital model comprising a model characterizing the source and a model characterizing the detector;
- an obtaining step for obtaining a digital model characterizing the aviation part;
- an evaluation step for evaluating a contrast-to-noise ratio as obtained by the digital imaging system on said aviation part for a plurality of distinct values of the settings, this evaluation step making use of the digital models that have been obtained characterizing the digital imaging system and the aviation part; and
- a determination step for determining "optimum" values for the settings that optimize the contrast-to-noise ratio, these optimum values being applied to the digital imaging system during the setting step.

Correspondingly, the invention also provides a system for non-destructively inspecting an aviation part, the system comprising:

- a digital imaging system, said digital imaging system being a digital tomography or X-ray system having a source of electromagnetic rays and a detector suitable for detecting the electromagnetic rays emitted by the source;
- a device for non-destructively inspecting the aviation part, the device being configured to use at least one digital image of the aviation part acquired by the digital imaging system.

This non-destructive inspection system is remarkable in that it further comprises an estimator device for estimating "optimum" values of settings for the digital imaging system, said optimum values of the settings being for applying to said digital imaging system prior to acquiring said at least one digital image of the aviation part while setting up the digital imaging system, said estimator device comprising:

- a first obtaining module configured to obtain a digital model characterizing the digital imaging system, the digital model comprising a model characterizing the source and a model characterizing the detector;
- a second obtaining module configured to obtain a digital model characterizing the aviation part;
- an evaluation module configured to evaluate a contrast-to-noise ratio as obtained by the digital imaging system on said aviation part for a plurality of distinct values of the settings, this evaluation module making use of the digital models that have been obtained characterizing the digital imaging system and the aviation part; and
- a determination module, configured to determine optimum values of the settings that optimize the contrast-to-noise ratio.

By way of example, the source of electromagnetic rays may be an X-ray source.

Thus, the invention proposes a method and a system that make it possible automatically to determine the settings for a digital imaging system of tomographic or X-ray type that is for use in a process of non-destructively inspecting an aviation part. In conventional manner, and by way of example, these settings comprise at least one setting selected from:
- an operating voltage of the source of the digital imaging system;
- an exposure time for which the aviation part is exposed to a beam of rays emitted by the source of the digital imaging system;
- a value for current applied to the source of the digital imaging system; and
- a filter thickness applied in the digital imaging system to the source (also referred to as a filter external to the source).

For this purpose, the method of the invention relies on various digital models of the digital imaging system and of the aviation part that enable optimum settings to be determined automatically: the invention enables such systems to be set up effectively, while avoiding any subjectivity that could affect such setting up. By way of example, these digital models may be predetermined and stored in databases, in the form of a set of values and/or curves. Obtaining these models then comprises accessing the databases and extracting from the database modeled physical parameters that are pertinent for performing the invention.

The criterion used by the invention for optimizing the above-mentioned settings is the contrast-to-noise ratio, which serves to quantify the quality of the images supplied by the digital imaging system under consideration. This ratio is determined, preferably in analytical manner, on the basis of the various models prepared in accordance with the invention: both a model of the digital imaging system, and more particularly of its main components, namely its source of electromagnetic rays and the detector that it uses for detecting the electromagnetic rays emitted by the source; and also a model of the aviation part that is to be subjected to non-destructive inspection and for which it is desired to acquire images by means of the digital imaging system.

The procedure thus adopted by the invention serves to provide an automatic and generic solution for obtaining settings that can be applied to numerous conventional tomographic and X-ray digital imaging systems. By having recourse to a digital model of the digital imaging system as used during the non-destructive inspection and that takes account of its physical parameters, the invention serves advantageously to take account of the specific features and of the uniqueness of the system.

Also, the settings proposed by the invention take account of the aviation part on which non-destructive inspection is to be performed. It is therefore adapted to that part and makes it possible to obtain an image of optimum quality for that part.

The invention thus provides a solution that is quick and effective for automatically obtaining settings for the digital imaging system used in the context of non-destructive inspection. The invention does not require any processing of digital images in two or three dimensions that have been obtained from the imaging system that is to be set up, where that can be found to be burdensome and complicated and, in any event, where that impedes determining optimum settings for the digital imaging system in automatic manner. Furthermore, the accuracy of the solution proposed by the invention makes it easy to apply in an industrial environment to any tomographic or X-ray type digital imaging system and to any part used in the aviation industry.

Also, it is applicable to numerous defects that might be present in the part, such as in particular material of insufficient thickness of excess thickness, pores, inclusions, etc. It should also be observed that by means of the invention, by optimizing the settings of the digital imaging system, it is ensured that optimum use is made of the system and of its components: as a corollary, the invention makes it possible in particular to reduce the amount of use that is made of the source of electromagnetic rays and to limit the rate of ageing of the detector used by the digital imaging system.

As mentioned above, the invention relies on modeling the main components of the digital imaging system and of the aviation part that is to be subjected to non-destructive inspection. This modeling makes it possible to quantify the impact of these elements on the quality of the digital image supplied by the digital imaging system.

Preferably, for the main components of the digital imaging system, consideration is given to a physical model that characterizes the energy responses of those components.

For example, the model characterizing the source and the model characterizing the detector provide energy responses as a function of wavelength respectively for the source and for the detector. This serves advantageously to take the polychromatic nature of the source into consideration.

Thus, in a particular implementation, the model characterizing the source provides emission spectra of the source for different values for the operating voltage of the source.

Each emission spectrum gives the intensity of the rays emitted by the source (i.e. the quantity of photons generated per unit time or per emission) as a function of wavelength. As mentioned above, such a model serves advantageously to take account of the polychromatic nature of the source. It takes the geometry of the source into consideration, and it can be determined by means of simulations (e.g. of Monte Carlo type), of empirical data, and/or of analytical expressions.

In a particular implementation, the model characterizing the source also provides estimates for at least two half-value attenuation layers of the source for different values of the operating voltage of the source, the method further comprising a validation step for validating the model characterizing the source by comparing the estimates for said at least two half-value attenuation layers of the source with experimental results.

This validation step makes it possible to ensure that the digital model used for characterizing the source is indeed representative of the physical reality of the source, and that it is therefore well adapted. This makes it possible to ensure that the settings extracted by means of the invention are indeed optimum for the imaging system under consideration.

In a particular implementation, the model characterizing the detector provides a spectral response of the detector to a beam of rays emitted by the source.

Such a response characterizes the way in which the detector weights the energies of the various photons reaching the source, as a function of wavelength. In the same manner as for the source, the model used for the detector thus serves likewise to take the polychromatic nature of the source into consideration.

In a particular implementation, the method further comprises a validation step for validating the model characterizing the detector, which step comprises:
- estimating at least one, and preferably at least three, theoretical gray levels seen by the detector for at least one given operating voltage of the source by using the model characterizing the source and the model characterizing the detector;

obtaining a measurement of at least one, and preferably of at least three gray levels seen by the detector for said at least one given operating voltage of the source; and comparing said at least one estimated theoretical gray level with said at least one measured gray level.

In this way, it is ensured that the digital model used for characterizing the detector and for extracting the optimum settings for the digital imaging system is indeed representative of reality. This makes it possible to determine that the optimum settings determined in accordance with the invention are pertinent.

As mentioned above, the invention relies on digital and physical modeling both of the main components of the digital system, and also of the aviation part that is to be subjected to non-destructive inspection.

In a particular implementation, the digital model characterizing the aviation part provides mass attenuation coefficients of the material making up the part for different energy values of a beam of rays emitted by the source.

Specifically, each part for which it is desired to acquire a digital image by means of the digital imaging system in order to carry out non-destructive inspection has its own physical properties (associated in part with the composition of the material making it up), which properties have an influence on the digital imaging system and on its operation. Taking account of the composition of the aviation part, and more particularly of its mass attenuation coefficient for various different energy values of the rays emitted by the source enables the digital imaging system to be set up in a manner that is optimum and informed.

In a particular implementation, for materials that do not comprise a single element, the digital model characterizing the aviation part may be obtained, by way of example, by:

an obtaining step for obtaining a chemical composition of the material making up the part, said material being made up of at least one chemical element;

for each chemical element making up the material, an obtaining step for obtaining a mass attenuation coefficient of that element for said different energy values; and a calculation step for calculating mass attenuation coefficients of the material for said different energy values from the mass attenuation coefficients of the elements making up the material for those different energies and from the proportions of those elements in the material.

By way of example, the mass attenuation coefficient of each element of the material may be obtained by consulting a database of the National Institute of Standards and Technology (NIST).

This procedure makes it possible to determine automatically the mass attenuation coefficient of an aviation part for each ray energy under consideration.

The criterion used by the invention for extracting the optimum settings for the system is the contrast-to-noise ratio (CNR). In accordance with the invention, this ratio is evaluated for different values of the settings that are to be optimized, and then the values of those settings that give rise to the optimum CNR are determined on the basis of the ratios as evaluated in this way.

In a particular implementation, the contrast-to-noise ratio is evaluated, for said plurality of distinct values of the settings, from signals that are characterized by physical parameters of the digital imaging system, in other words of the real system under consideration.

In particular, the contrast-to-noise ratio may be evaluated for various different values of the settings that are to be optimized, on the basis of signal values seen by the detector of the digital imaging system when determined thicknesses of the aviation part pass the beam of electromagnetic rays emitted by the source, the signal values being obtained analytically (i.e. by means of an analytical formula) from the digital models characterizing the digital imaging system and the aviation part.

This analytical evaluation of the contrast-to-noise ratio, while taking account of the physical parameters of the digital system, facilitates determining optimum settings for the digital imaging system in automatic manner. Specifically, the invention is easy to implement since it relies on digital calculations that are not only simple, but also scalar: calculating the contrast-to-noise ratio requires knowledge only of the signal values seen by the detector of the digital imaging system when determined thicknesses of the aviation part pass the beam of electromagnetic rays emitted by the source (these values representing gray levels, for example);

furthermore, for given settings for the digital imaging system, these values themselves very only as a function of a single magnitude, namely the thickness under consideration of the part passing the beam of rays emitted by the source.

The invention therefore does not require burdensome and complicated processing of digital images in two or three dimensions coming from the imaging system that is to be set up.

Also, by means of steps of validating the digital models that may optionally be performed, it can be guaranteed that the analytical formula used for automatically determining the settings for the digital imaging system accurately represent the technical characteristics of the digital imaging system.

In a particular implementation, during the evaluation step, the contrast-to-noise ratio, written CNR, as obtained by the digital imaging system on said aviation part is evaluated for different values of the settings using the expression:

$$CNR = \frac{S_{det}(L, \varepsilon) - S_{det}(L)}{\sqrt{S_{det}(L)}}$$

or:

$$CNR = \frac{S_{det}(L, \varepsilon) + S_{det}(L)}{\sqrt{S_{det}(L) + S_{det}(L, \varepsilon)}}$$

where $S_{det}(L)$ and $S_{det}(L,\varepsilon)$ respectively designate a signal value seen by the detector of the digital imaging system when the beam of electromagnetic rays (e.g. X-rays) emitted by the source passes through a respective thickness L or L–ε of the aviation part, ε designating the thickness of an indicator that is looked for during the non-destructive inspection in the aviation part, said signal values being defined by:

$$S_{det}(L) = \sum_j I_0(E_j, V) A(E_j, L) R(E_j)$$

and $$S_{det}(L, \varepsilon) = \sum_j I_0(E_j, V) A_\varepsilon(E_j, L, \varepsilon) R(E_j)$$

where:
- $I_0(E_j,V)$ designates the intensity of the photons present in a beam of electromagnetic rays of energy $E_j$ emitted by the source and corresponding to a wavelength of $\lambda_j$, said intensity depending on the operating voltage V of the source, on the exposure time the aviation part is exposed to the beam of rays emitted by the source, and on the current value applied to the source;
- $A(E_j,L)$ designates an attenuation factor to which the beam of electromagnetic rays emitted by the source of energy $E_j$ is subjected, this attenuation factor depending on the mass attenuation coefficient of the material making up the aviation part and on the thickness L;
- $A_\varepsilon(E_j,L,\varepsilon)$ designates an attenuation factor to which the beam of electromagnetic rays emitted by the source of energy $E_j$ is subjected, this attenuation factor depending on the mass attenuation coefficient of the material making up the aviation part, on its thickness L, and on the thickness $\varepsilon$ of the indicator; and
- $R(E_j)$ designates the spectral response of the detector as a function of the energy $E_j$.

The calculation proposed by the invention gives an accurate and reliable evaluation of the quality of the images supplied by the digital system for the aviation part under consideration. This makes it possible to extract optimum settings for the digital imaging system that are adapted to the main components of the digital imaging system and to the aviation part being subjected to non-destructive inspection.

Given an appropriate definition of the thickness $\varepsilon$, it should be observed that the model proposed by the invention for calculating the contrast-to-noise ratio applies to various different types of indicator that might be looked for in the aviation part during destructive inspection. The term "indicator" is used to cover any structures that might be looked for in the part and that represent in particular the presence of a defect in the part, e.g. such as extra thickness (e.g. extra thickness in an internal cavity in a ceramic core for making high-pressure turbine blades), insufficient thickness, an inclusion, a pore, etc. By applying the above-specified model, the settings determined for the digital imaging system are also adapted to the indicator that is looked for in the aviation part during the non-destructive inspection, making the indicator easier to detect.

By way of illustration, when the looked-for defect is insufficient thickness or a pore, the thickness $\varepsilon$ is selected to be "negative" so as to represent a negative variation in thickness relative to the thickness L of the aviation part, where such insufficient thickness or such a pore is represented by a lack of material in the part. When the looked-for defect is extra thickness, the thickness s is selected, on the contrary, to be "positive" in order to represent the presence of surplus material. For a defect of the inclusion type, the thickness $\varepsilon$ represents the thickness of material constituting the inclusion.

In a particular implementation:
the attenuation factor $A(E_j,L)$ is defined by:

$$A(E_j,L)=A_{fint}(E_j,L_{fint})A_{fext}(E_j,L_{fext})A_{mat}(E_j,L); \text{ and}$$

the attenuation factor $A(E_j,L,\varepsilon)$ is defined by:

$$A(E_j,L,\varepsilon)=A_{fint}(E_j,L_{fint})A_{fext}(E_j,L_{fext})A_{mat}(E_j,L-\varepsilon)A_{ind}(E_j,\varepsilon)$$

where $A_{fint}(E_j,L_{fint})$, $A_{fext}(E_j,L_{fext})$, and $A_{mat}(E_j,L-\varepsilon)$ designate respectively the attenuation to which the beam of electromagnetic rays (e.g. X-rays) emitted by the source of energy $E_j$ is subjected due to filtering inherent to the source, the attenuation to which the beam of electromagnetic rays of energy $E_j$ is subjected due to filtering external to the source, the attenuation to which the beam of electromagnetic rays of energy $E_j$ is subjected due to the material making up the aviation part, and the attenuation to which the beam of electromagnetic rays of energy $E_j$ is subjected in the presence of the looked-for indicator of thickness $\varepsilon$.

The attenuation factor defined in this implementation makes it possible, in a very complete manner, to take into consideration the various attenuations to which the beam of rays emitted by the source is subjected while the digital imaging system is in use. These attenuations are modeled herein by filtering operations performed on the beam of rays emitted by the source: filtering inherent to the source (and to the material making up the source); filtering external to the source; and also filtering associated specifically with the material of the aviation part that is to be inspected, including the filtering performed by the elements making up the part and also by the indicator looked for in the part (which indicator may for example be constituted by a void, when it is a pore).

In a particular implementation, the estimation step comprises performing a plurality of iterations scanning through all or some of the plurality of distinct values of the settings, and during which the contrast-to-noise ratio is evaluated by accessing values of the digital models characterizing the source, the detector, and the aviation part as stored previously in the databases.

This implementation, which relies on previously storing digital models in databases and on nested loops that scan through various different values of the settings, serves to accelerate determining optimum settings for the digital imaging system.

In a particular implementation, certain steps of the non-destructive inspection method, and in particular the step of estimating settings, are determined by computer program instructions.

Consequently, the invention also provides a computer program on a data medium, the program being suitable for being performed in a device for estimating settings for a digital imaging system, or more generally in a computer, the program including instructions adapted to performing the estimation step of a non-destructive inspection method as described above.

The program may use any programming language, and it may be in the form of source code, object code, or code intermediate between source code and object code, such as in a partially compiled form, or in any other desirable form.

The invention also provides a computer readable data medium, including instructions of a computer program as mentioned above.

The data medium may be any entity or device capable of storing the program. For example, the medium may comprise storage means such as a read only memory (ROM), for example a compact disk (CD) ROM or a microelectronic circuit ROM, or indeed magnetic recording means, e.g. a floppy disk or a hard disk.

Furthermore, the data medium may be a transmissible medium such as an electrical or optical signal that can be conveyed via an electrical or optical cable, by radio, or by other means. The program of the invention may in particular be downloaded from a network of the Internet type.

Alternatively, the data medium may be an integrated circuit in which the program is incorporated, the circuit being adapted to execute or to be used in the execution of the method in question.

In other implementations, it is also possible to envisage that the non-destructive inspection method and system of the invention present in combination some or all of the above-mentioned characteristics.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF THE INVENTION

Figure 1:
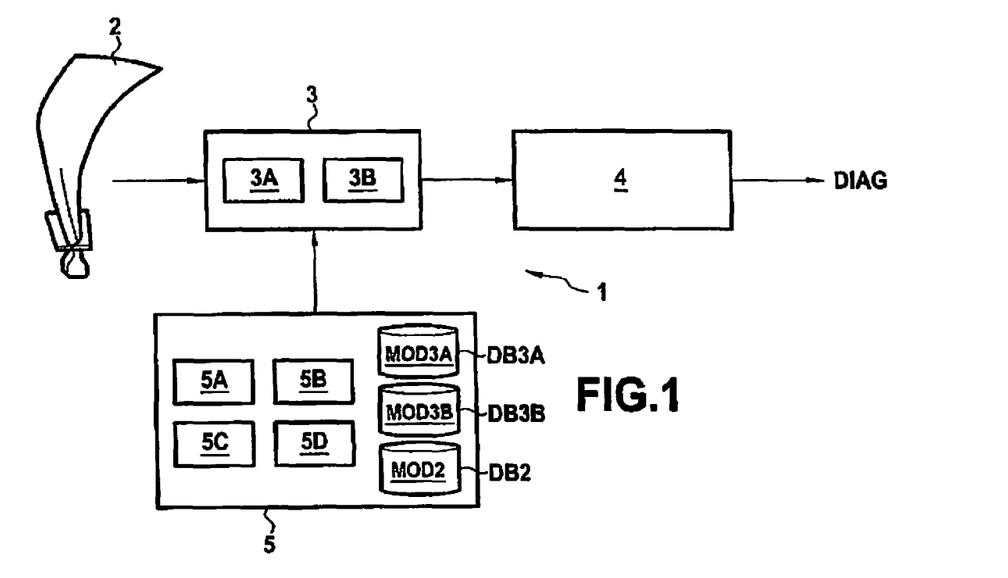
FIG. 1 shows, in its environment, a non-destructive inspection system in accordance with the invention comprising a digital imaging system, a non-destructive inspection device, and a device for estimating settings of the digital imaging system.

FIG. 1 shows, in its environment, a non-destructive inspection system 1 in accordance with the invention in a particular embodiment. In the presently-envisaged example, the system 1 serves to perform non-destructive inspection of aviation parts, e.g. such as a turbine fan blade 2. Nevertheless, no limitation is associated with the nature of the part to which the non-destructive inspection is applied. More generally, it may apply to any type of part, preferably an aviation part, such as for example a part of an aeroengine, of a rocket, etc.

In accordance with the invention, the non-destructive inspection system 1 comprises:
- a digital imaging system 3 suitable for acquiring and supplying one or more digital images IM of the aviation part 2; and
- a device 4 for non-destructively inspecting the aviation part 2 and configured to make use of the digital image(s) IM of the aviation part as acquired and supplied by the digital imaging system 3 and to produce an integrity diagnosis DIAG for the part 2. This diagnosis relates in particular to one or more indicators IND or parameters that are looked for in the part. No limitation is associated with the nature of these indicators; by way of example, they may be indicators representing extra thickness in the part, insufficient thickness, or the presence of pores or of inclusions, etc. Such a non-destructive inspection device is itself known and is not described in greater detail herein.

In this example, the digital imaging system 3 is a digital tomography or X-ray system. In known manner, it comprises a source 3A of electromagnetic rays (e.g. a source emitting beams of X-rays), and a detector 3B suitable for detecting the electromagnetic rays emitted by the source 3A.

In this example, the source 3A applies the principle of electrons bombarding a metal target in an X-ray tube: the electrons are extracted from a metal filament (the cathode) and then accelerated by a large voltage applied to the source 3A (the "operating voltage" in the meaning of the invention) in a vacuum tube. This electron beam emitted by the source 3A is focused so as to bombard a metal target (the anode), e.g. made of tungsten. Interactions between electrons and matter when the electrons strike the target produce X-ray photons. This operation is itself known and is not described in greater detail herein.

The detector 3B of the digital imaging system 3 operates indirectly: a scintillator absorbs the X-ray photons produced by the source 3A, and by fluorescence mechanisms, it emits visible light. The visible photons are then directed to an array of photodiodes, with each element of the array of photodiodes being associated with a pixel. The visible photons are converted into electric charges in the array of photodiodes, and then into an electrical signal by a photomultiplier. The electrical signal conveys the gray level that is associated with each pixel of the detector, and that represents the absorption of photons at the pixel under consideration. Such operation is itself known and is not described in greater detail herein.

In order to supply digital images IM of the aviation part 2 that enable effective non-destructive inspection to be performed by the non-destructive inspection device 4, it is conventional to apply certain settings to the digital imaging system 3. These settings relate in particular to various parameters of the digital imaging system 3, and in the presently-described embodiment they comprise:
- the operating voltage V of the source 3A;
- the exposure time for which the aviation part 2 is exposed to the beam of rays emitted by the source 3A;
- the value of the current $i$ applied to the source 3A; and
- the thickness of a filter applied in the digital imaging system to the source 3A (also referred to as the filter external to the source).

Nevertheless, this list is not exhaustive, and other settings for the digital imaging system 3 can be envisaged; likewise, it is possible to envisage using only some of the above-specified parameters.

In accordance with the invention, the non-destructive inspection system 1 advantageously includes an estimation device 5 for automatically estimating the above-mentioned settings. This estimator device 5 is suitable for estimating the optimum values for these settings that are to be applied to the digital imaging system 3 while it is being set up prior to acquiring digital images IM of the aviation part 2.

Figure 2:
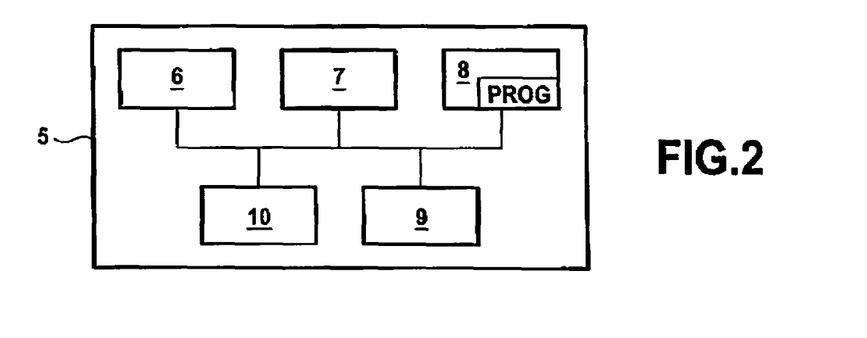
FIG. 2 is a block diagram showing the hardware architecture of the FIG. 1 device for estimating settings.

In the presently-described embodiment, the estimator device 5 has the hardware architecture of a computer, as shown diagrammatically in FIG. 2.

It comprises in particular a processor 6, a random access memory (RAM) 7, a ROM 8, a non-volatile flash memory 9, together with input/output means 10 enabling an operator of the digital imaging system 3 to interact with the estimator device 5. By way of example, these input/output means 10 comprise a screen, a keyboard, and a man/machine interface enabling the operator of the system 3 in particular both to input data into the estimator device 5 and also to obtain optimum settings for the digital imaging system 3 as determined by the device in accordance with the invention.

The ROM 8 of the estimator device 5 constitutes a data medium in accordance with the invention that is readable by the processor 6 and that stores a computer program in accordance with the invention.

The computer program PROG defines functional and software modules that are configured in this example to estimate optimum settings for the digital imaging system 3 in accordance with the invention. These functional modules rely on and/or control the above-mentioned hardware elements 6-10 of the estimator device 5. In this example, and as shown in FIG. 1, they comprise:

a first obtaining module 5A configured to obtain a digital model MOD3 characterizing the digital imaging system 3, the digital model comprising both a model MOD3A characterizing the source 3A and also a model MOD3B characterizing the detector 3B. The first obtaining module 5A in this example is configured to extract these digital models MOD3A and MOD3B from databases DB3A and DB3B of the estimator device 5, in which the models have previously been stored after being determined. The term "database" is used broadly herein to cover any data sets enabling information to be stored;

a second obtaining module 5B configured to obtain a digital model MOD2 characterizing the aviation part 2; in this example, the second obtaining module 5B is configured to extract the digital model MOD2 from a database DB2 of the estimator device 5 in which the model has previously been stored after being determined;

an evaluator module 5C configured to use a plurality of distinct setting values to evaluate a contrast-to-noise ratio obtained for the digital imaging system 3 and the aviation part 2, this evaluator module 5C making use of the digital models MOD3 (including both models MOD3A and MOD3B) and MOD2 obtained by the modules 5A and 5B and respectively characterizing the digital imaging system 3 and the aviation part 2; and an automatic determination module 5D configured to determine optimum values for the settings automatically in order to optimize the contrast-to-noise ratio.

The functions of the various modules are described in greater detail with reference to the estimation step of the non-destructive inspection method of the invention as performed by the estimator device 5 of the FIG. 1 non-destructive inspection system 1.

It should be observed that two distinct obtaining modules 5A and 5B are described herein, but that it is nevertheless possible in a different embodiment for the functions performed by those two modules to be performed by a single module.

Figure 3:
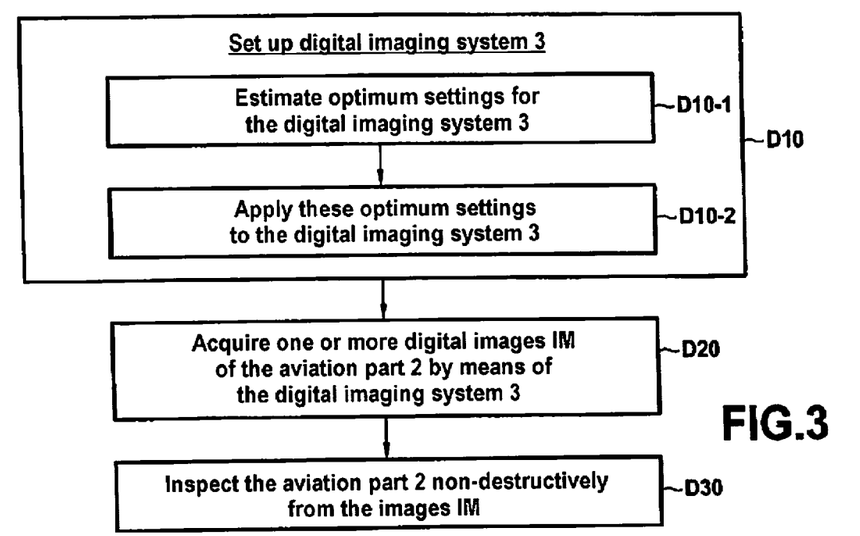
FIG. 3 is in the form of a flow chart showing the main steps of a non-destructive inspection method of the invention in a particular implementation in which it is performed by the non-destructive inspection system of FIG. 1.

In order to better understand the advantages provided by the invention, the description below summarizes briefly the main steps of the non-destructive inspection method of the invention. FIG. 3 shows these steps as they are performed by the non-destructive inspection system 1 of FIG. 1.

In accordance with the invention, it is assumed herein that it is desired to perform non-destructive inspection of the aviation part 2 on the basis of one or more digital images of that part as acquired by means of the digital imaging system 3 (tomographic or X-ray system).

For this purpose, various parameters of the digital imaging system 3 are set up beforehand (step D10). In the presently-described implementation, these parameters comprise, as mentioned above:

the operating voltage V of the source 3A;
the exposure time for which the aviation part 2 is exposed to the beam of rays emitted by the source 3A;
the value of the current $i$ applied to the source 3A; and
the thickness of the filter applied in the digital imaging system to the source.

In accordance with the invention, these parameters are set up in two stages:

in a first stage, optimum setting values for the parameters are estimated automatically by the estimator device 5 (step D10-1); and then in a second stage, the optimum values as estimated in this way are applied to the digital imaging system 3 in order to set it up (step D10-2). By way of example, this setting up of the digital imaging system 3 may be performed manually by an operator of the system 3 using the optimum values supplied by the estimator device 5.

Thereafter, one or more digital images IM of the aviation part 2 are acquired by the digital imaging system 3 as set up in this way (step D20), and as supplied to the non-destructive inspection device 4.

Non-destructive inspection of the aviation part 2 is then performed via the non-destructive inspection device 4 on the basis of the digital images IM (step D30). In known manner, such a step may be performed in various ways, and it is not described in detail herein. The images as obtained in this way give non-destructive access to the part under inspection. By way of example, they may be compared by known image processing methods with images that have been acquired using the same method on a sound part in order to search for any anomalies in the part under inspection.

In accordance with the invention, the estimate made in step D10-1 concerning the optimum settings for the digital imaging system 3 for use on the aviation part 2 relies on various digital models that physically characterize the aviation part 2 and the digital imaging system 3, and in particular its main components, namely the source 3A and the detector 3B. These digital models are obtained respectively by the modules 5A and 5B of the estimator device 5. They may be pre-calculated or they may be obtained on the fly while estimating optimum settings. Nevertheless, in the presently-described implementation, these digital models are pre-calculated, and they are stored in the databases (DB3A, DB3B, and DB2) of the estimator device 5 for future use. This serves advantageously to accelerate searching for optimum settings when it is desired to use the digital imaging system 3.

The description below begins with how the digital models are obtained (i.e. constructed) and made available to the modules 5A and 5B of the estimator device 5 in the databases DB3A, DB3B, and DB2.

Figure 4A:
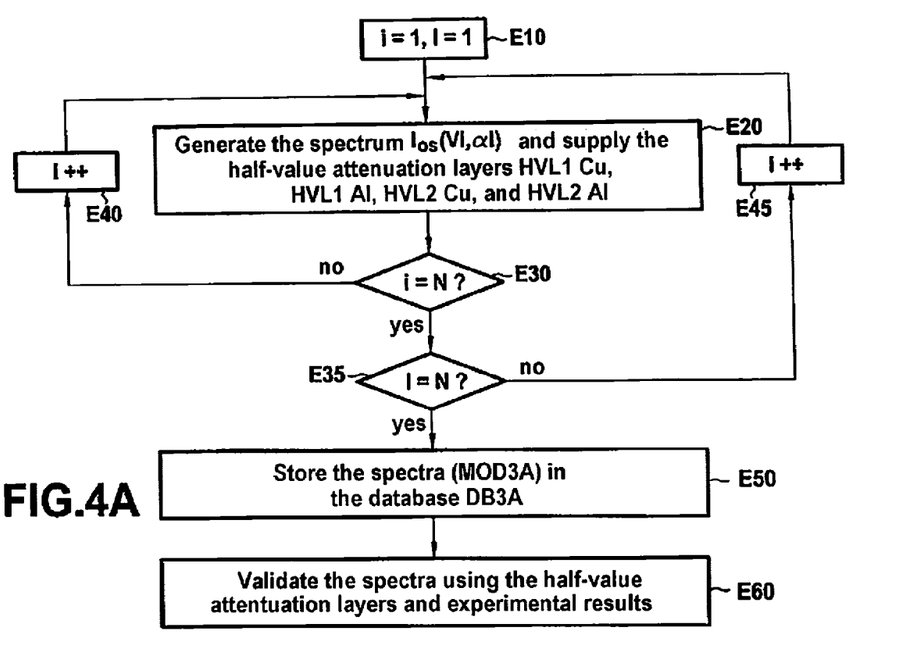
FIGS. 4A, 4B, and 4C show respectively the main steps performed by the FIG. 1 device for estimating settings in order to obtain a digital model of the source and a digital model of the detector of the FIG. 1 digital imaging system, and also a digital model of an aviation part on which the FIG. 1 non-destructive inspection system is used.

FIG. 4A shows the main steps performed in order to obtain the model MOD3A characterizing the source 3A of the digital imaging system 3. It should be observed that these steps may be performed by the module 5A of the estimator device 5 or by any other module external to the estimator device 5 and suitable for storing the resulting model MOD3A in the database DB3A.

In this example, the model MOD3A provides emission spectra of the source 3A for various different operating voltage values of the source, written $V_1, V_2, \ldots, V_N$, where N is an integer greater than 1. In the presently-envisaged example, the operating voltages $V_1, V_2, \ldots, V_N$ lie in the range 0 to 450 kilovolts (kV), in steps of 1 kV.

In the presently-described implementation, the model MOD3A also provides emission spectra of the source 3A for N operating voltage values of the source and for M values of the angle of inclination relative to the horizontal of the anode of the source 3A, where M is an integer greater than 1. It should be observed specifically that the angle of inclination of the anode of the source has an influence on the angle of emission of the source 3A, which is important for the quality of the spectrum (heel effect).

The term "emission spectrum" is used herein to mean the intensity (i.e. the number of photons emitted per unit time or per emission) of the beams of rays emitted by the source 3A as a function of the wavelength of the rays. Such modeling serves advantageously to take into consideration the polychromatic nature of the source 3A. It may be observed that wavelength is associated uniquely with the energy of the beams of rays under consideration. In other words, a wavelength indexed by an integer j and written $\lambda_j$ corresponds to a single beam energy value $E_j$.

In order to determine the emission spectra of the model MOD3A corresponding to the N possible values of the operating voltage of the source and the M possible values of the angle of inclination of the anode (initialization step E10, test steps E30 and E35, and incrementation steps E40 and E45), the presently-described implementation makes use of simulation software for modeling the behavior of the source 3A. By way of example, the software is "SpekCalc" as developed by V. N. Hansen et al., and as described in particular in the document entitled "An efficient Monte Carlo-based algorithm for scatter correction in keV cone-beam CT", Physics in Medicine and Biology, 54: pp. 3847-3864, 2009. It uses electron interaction processes at the anode together with data from Monte-Carlo type simulations and/or empirical expressions and/or analytical expressions serving to estimate the emission spectra. It should be observed that the SpekCalc software serves to model emission spectra for angles of inclination of the anode of the source lying in the range 1° to 90°, but that sources of electromagnetic rays and in particular of X-rays nevertheless rarely possess angles of inclination going beyond 45°. By way of example, consideration is given herein to angles of inclination of the anode of the source lying in the range 5° to 45° in increments of 1°.

The emission spectra corresponding to the N operating voltage values and to the M angle of inclination values obtained using the SpekCalc software (step E20) are stored in the database DB3A (step E50). In the presently-described implementation, in order to access one of the emission spectra stored in the database DB3A, the module 5A supplies the database DB3A with the following (or in equivalent manner interrogates it by means of):

the angle of inclination $\alpha_l$ of the anode of the source 3A relative to the horizontal; and the maximum energy $Emax(V_i)$ in electron volts (eV) or in kilo electron volts (keV) corresponding to the operating voltage $V_i$ of the source 3A under consideration for which it is desired to estimate the emission spectrum of the source.

The module 5A thus obtains the emission spectrum of the source 3A for the operating voltage $V_i$ and the angle $\alpha_l$, which spectrum is written below in this description $I_{OS}(V_i, \alpha_l)$. It may be observed that each emission spectrum $I_{OS}(V_i, \alpha_l)$ gives the number of photons of energy $E_1$ per unit current and per unit time for various different energies $E_j$, j=1, . . . , K (or in equivalent manner for various different wavelengths $\lambda_j$, j=1, . . . , K), where K is an integer greater than 1.

In the presently-described implementation, the database DBA also includes estimates of at least two half-value attenuation layers of the source 3A for two distinct materials, namely copper (Cu) and aluminum (Al), for each operating voltage $V_i$ and for each angle of inclination $\alpha_l$. These estimates are supplied by the SpekCalc software during the step E20. More precisely, the database D3A comprises:

the half-value attenuation layers $HVL1Cu(V_i, \alpha_l)$ and $HVL1Al(V_i, \alpha_l)$ giving the thickness needed of material (specifically copper or aluminum) for halving the radiation of the beam at 1 meter (m) from the window of the source; and the half-value attenuation layers $HVL1Cu(V_i, \alpha_l)$ and $HVL1Al(V_i, \alpha_l)$ giving the thickness of material needed (specifically copper or aluminum) to halve the radiation of the beam resulting respectively from using the half-value attenuation layers $HVL1Cu(V_i, \alpha_l)$ and $HVL1Al(V_1, \alpha_l)$ at 1 m from the window of the source.

In this example, the module 5A accesses these estimates at the same time as it accesses the emission spectrum of the source 3A for the operating voltage $V_i$ and the angle $\alpha_l$.

In the presently-described implementation, provision is made to validate the digital model MOD3A, in other words, the emission spectra stored in the database D3A (step E60). By way of example, this validation may be performed by the module 5A or by another module external to the estimator device 5, by accessing the emission spectra stored in the database D3A and the estimates for the associated half-value attenuation layers. In the description below, for reasons of simplification, the module performing this validation is referred to in general manner as the "validation module".

This validation seeks to ensure that the spectra generated for the source 3A are indeed representative of the physical reality of the source 3A. When performing the invention, this contributes to enabling the estimator device 5 to obtain optimum values for the settings.

For this purpose, the validation module acts, for at least a selection of spectra comprising at least two spectra generated during step E20 for two different operating voltages of the source 3A, so as to compare the estimates of the half-value attenuation layers HVL1Cu, HVL1Al, HVL2Cu, and HVL2Al supplied during step E20 for those voltages with experimental results.

The experimental values for the half-value attenuation layers HVL1Cu, HVL1Al, HVL2Cu, and HVL2Al may be generated beforehand, using layers of copper and of aluminum of differing thickness together with a dosimeter, and they may then be stored in the database DB3A in order to be compared with the values of the half-value attenuation layers that accompany the spectra in the database DB3A.

If the values HVL1Cu, HVL1Al, HVL2Cu, and HVL2Al corresponding to each spectrum in the selection of spectra under consideration in the database do indeed correspond to the experimental values, then that means that the spectra generated in step E20 and stored in the database DB3A are valid. In the meaning of the invention, they constitute a validated digital model MOD3A characterizing the source 3A. In practice, it should be observed that it suffices to perform this validation on a selection of spectra corresponding to a determined range of voltage and current values.

It should also be observed that in the presently-described implementation, if the values HVL1Cu, HVL1Al, HVL2Cu, and HVL2Al of a spectrum of the database DB3A do not correspond with the experimental values, the spectrum is conserved in the database DB3A. Nevertheless, the validation module will search elsewhere in the database DB3A for the spectrum having values HVL1 and HVL2 that correspond best with the values found experimentally for HLVA and HLV2.

Figure 4B:
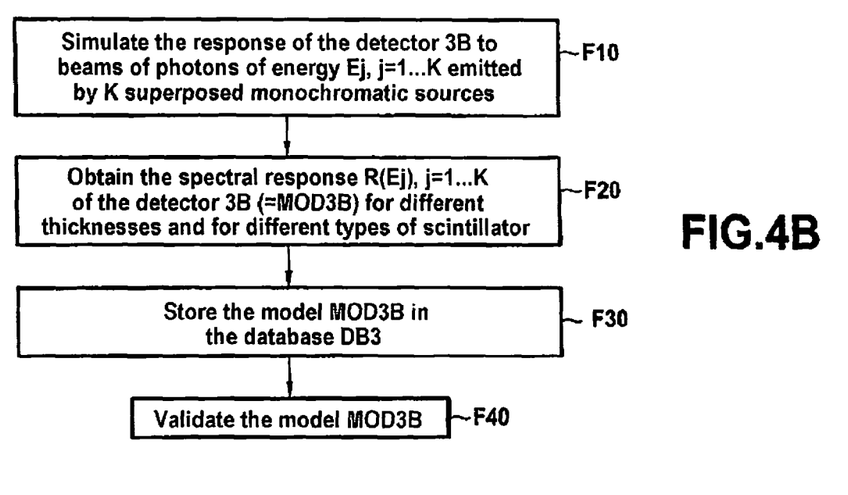

With reference to FIG. 4B, there follows a description of the main steps performed in order to obtain the model MOD3B characterizing the detector 3B of the digital imaging system 3. It should be observed that these steps may be performed by the module 5A of the estimator device 5 or by some other module external to the estimator device 5 and suitable for storing the resulting model MOD3B in the database DB3B.

In this example, the model MOD3B supplies a spectral response written R for the detector to a beam of rays emitted by the source and having energy $E_j$, j=1, . . . , K. In other words, the model MOD3B characterizes how the detector 3B weights the various energies of photons coming from the source. It should be observed that this spectral response depends to a great extent on the capacity of the scintillator of the detector 3B to absorb photons of different energies. Consequently, in the presently-described implementation, in order to obtain the model MOD3B, appropriate simulation software is used beforehand to simulate so-called "response" curves showing the quantity of energy absorbed in the scintillator of the detector 3B as a function of the energy of incident photons (step F10), and as a function of the thickness and of the type of the scintillator in the detector 3B.

Preparing such response curves in this example relies on simulating the dose delivered on the scintillator by the beam of photons, i.e. the energy that is absorbed by the scintillator. For this purpose, the model makes use of a number K of "individual" independent photon sources, each having the same intensity and each being monochromatic. Each source indexed by j, j=1, . . . , K, emits a beam of photons of energy $E_j$ with $E_j < eV_{max}$, where $V_{max}$ is the maximum operating voltage of the source 3A. The beam emitted by each source is non-divergent and comprises a sufficient number of photons (i.e. sufficient intensity), typically greater than $10^6$. The K sources are superposed at the same location.

It should be observed that the beam dose absorbed by the scintillator depends directly on its thickness. A plurality of thicknesses are therefore evaluated. At the end of the simulations, a plurality of response curves are thus obtained that correspond to a plurality of scintillator thicknesses (step F20). This enables the module 5A then to select the scintillator that best represents the detector 3B. For example, for a cesium iodide (CsI) scintillator, it is possible to envisage thicknesses lying in the range 350 micrometers (μm) to 750 μm in steps of 10 μm, whereas for a gadolinium oxysulfide (GdOS) scintillator, it is possible to envisage thicknesses lying in the range 100 μm to 400 μm in steps of 10 μm.

In the presently-described implementation, the simulations performed in step F10 are carried out using the GateDoseSpectrumActor module implemented in the GATE/Geant 4 (Geant 4 Application for Tomography Emission) platform that serves to calculate the response of the detector 3B to each energy. In known manner, the GATE/Geant 4 platform makes use of Monte-Carlo type simulations in order to model X-ray tomography and radiography.

The spectral responses of the detector 3B $R(E_j)$, j=1, . . . , K that are obtained during the simulations for different thicknesses of scintillator are stored in the database D3B (step F30). In the meaning of the invention, they constitute a "digital model" MOD3B that characterizes the detector 3B. They thus become accessible to the module 5A of the estimator device 5 for determining the optimum settings for the digital imaging system, as described below.

In the presently-described implementation, the spectral responses obtained for the detector 3B are also validated in order to ensure that they comply with the digital reality of the detector 3B (step F40). This validation may be performed by the module 5A or by any other validation module, e.g. external to the estimator device 5. For simplification purposes, in the description below, reference is made in general manner to a "validation module".

In order to perform this validation, the inventors have relied on the following observations:
the mean energy and the maximum energy of photons in a spectrum are characteristics that depend on the operating voltage of the source, and any variation in that voltage appears in the gray levels (written GL) seen by the detector; and
variation in the mean gray level GL as a function of the mean energy of the photon beams emitted by the source depends on the spectral response of the detector.

In order to validate the spectral response obtained in step F20, the inventors thus propose relying on the method set out by P. V. Granton et al., in the document entitled "A combined dose calculation and verification method for a small animal precision irradiator based on onboard 290 imaging", Med. Phys., Vol. 39, No. 7, page 4155, 2012. That method, when applied in the context of the invention, consists in observing empirically the variations in the gray levels of the detector 3B as a function of the operating voltage of the source 3A, and in comparing those gray levels with theoretical estimates for those gray levels as evaluated by using the digital model MOD3A and the digital model MOD3B.

More particularly, during the validation step F40, the validation module begins by obtaining a plurality of mean gray level measurements written $GL_i^{me}$, i=1, . . . , I, where I is an integer greater than 1, as seen by the detector 3B for a plurality of operating voltages $V_1, V_2, \ldots, V_I$ of the source 3A varying from a minimum voltage $V_{min}$ to the maximum voltage $V_{max}$. For simplification purposes, it is assumed herein that I=N, and that the operating voltages $V_1, V_2, \ldots, V_I$ coincide with the operating voltages $V_1, V_2, \ldots, V_N$ considered above for obtaining the module MOD3A.

It should be observed that during this step, the measurements may be taken directly by the verification module, or in a variant they may be obtained by the module from a database in which such measurements as performed previously have been stored.

The validation module also estimates theoretical gray levels $GL_i^{then}$, i.e. for each of the operating voltages $V_1, V_2, \ldots, V_N$.

In the presently-described implementation, a theoretical gray level $G_i^{theo}$, i=1, . . . , N corresponding to an operating voltage $V_i$ is estimated by the verification module for a beam of energy $E_j$ by multiplying the response $R(E_1)$ obtained for the detector 3B (i.e. extracted from the digital model MOD3B) by the value $I_{OS}(V_i, E_j)$ of the emission spectrum $I_{OS}(V_i)$ of the source 3A associated with the voltage $V_i$ (extracted from the digital model MOD3A and corresponding to the angle of inclination of the anode of the source 3A). This operation is repeated for all of the beam energies $E_j$, j=1, . . . , K and for all of the scintillator thicknesses for which a spectral response is available in the database D3B. It should be observed that for simplification purposes, a single number K is used herein for all of the operating voltages.

Nevertheless, in practice, the energies that are considered vary between a minimum value (e.g. 1 keV) and a maximum value that depends on the operating voltage under consideration.

Thereafter, the verification module obtains the mean theoretical gray level by using the following expression:

$$GL_i^{theo} = \sum_{j=1}^{N} R(E_j) I_{0s}(V_i, E_j)$$

for i=1, ..., N.

Thereafter, the verification module compares this value with the previously-obtained empirical values $GL_i^{me}$, i=1, ..., N. In the presently-described implementation, in order to perform this comparison, the verification module begins by calculating a normalization coefficient for each $$c_i = \frac{GL_i^{em}}{GL_i^{theo}}$$

Thereafter it evaluates the normalized theoretical gray levels as follows:

$$GL_{i,j}^{theo,norm} = GL_i^{theo} \cdot c_j$$

for i, j=1, ..., N.

Thereafter, the verification module calculates the following error:

$$s_j = \sqrt{\sum_{i=1}^{N} \left( GL_i^{em} - GL_{i,j}^{theo,norm} \right)^2}$$

and selects the normalization coefficient $c_j$ corresponding to the minimum error $s_j$. The theoretical gray level corresponding to this normalization coefficient is written $GL_i^{theo,norm}$.

Thereafter, the verification module compares the values of $GL_i^{em}$ and of $GL_i^{theo,norm}$, e.g. by plotting the curves log($GL_i^{theo,norm}$) and log($GL_i^{em}$) vs. log(avg(E)). If the curves log($GL_i^{theo,norm}$) and Mg($GL_i^{em}$) coincide, that means the response model MOD3B of the detector has been validated. The verification module performs these operations for all scintillator thicknesses for which a spectral response is stored in the database DB3, and it selects the spectral response that corresponds best to the measured gray level values.

It should be observed that although the steps of validating the models MOD3A and MOD3B are recommended, they are nevertheless optional.

Finally, as mentioned above, the invention also relies on a third digital model MOD2 characterizing the aviation part. This model is stored in the database DB2 so as to be used by the second obtaining module 5B. There follows a description with reference to FIG. 4C of the main steps performed in order to obtain this model MOD2. These steps are performed by the module 5B, however they could be performed by any other module, e.g. a module external to the estimator device 5.

Figure 4C:
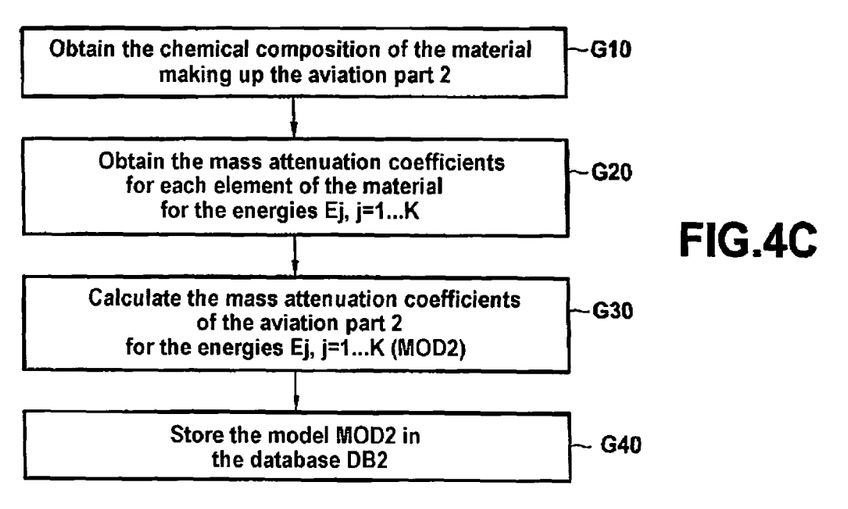

In the presently-described implementation, the digital model MOD2 characterizing the aviation part 2 supplies mass attenuation coefficients for the material making up the aviation part for different energy values $E_j$, j=1, ..., K of the beam of rays emitted by the source 3A.

In order to obtain this digital model MOD2, the second obtaining module 5B begins by obtaining the chemical composition of the material making up the aviation part 2 (step G10). The term "chemical composition" is used to mean the various chemical elements making up the material and also their proportions by mass in the material. By way of example, this chemical composition may be supplied to the second module 5B by the operator of the digital imaging system 3 or by some other person via the input/output means 10 of the estimator device 5, or it may be read by the module 5B from a previously established file.

Thereafter, the module 5B obtains for each chemical element making up the material of the aviation part 2, a mass attenuation coefficient for that element for the various energy values $E_j$, j=1, ..., K (step G20).

In the presently-described implementation, the step G20 comprises consulting an NIST database, which comprises, for each chemical element in the periodic table of elements (also known as Mendeleev's table), the mass attenuation coefficient for that element.

Thereafter, the module 5B calculates for said various energy values $E_j$, j=1, ..., K, the mass attenuation coefficient of the material of the aviation part 2 by using the following expression (step G30):

$$\mu(E_j) = \sum_{m=1}^{M} w_m \mu(m, E_j)$$

where M is an integer greater than or equal to 1 giving the number of chemical elements making up the material of the part 2, $w_m$ is the proportion by mass of the chemical element indexed by m in the material of the part 2, and where $\mu(m,E_j)$ is the mass attenuation coefficient of the chemical element indexed by m for the energy $E_j$.

The mass attenuation coefficients $\mu(E_j)$, j=1, ..., N as obtained in this way constitute the digital model MOD2 and they are stored in the database DB2 (step G40).

There follows a description of how the three models MOD3A, MOD3B, and MOD2 are used in accordance with the invention by the estimator device 5 in order to determine the optimum settings for the digital imaging system 3 so as to obtain one or more images of the aviation part 2 for non-destructive inspection thereof. It should be observed that the above-mentioned models may be calculated prior to being used and then stored, as described above in the databases DB3A, DB3B, and DB2 that are accessible to the estimator device 5. Access to the databases in order to obtain these models (or all or some of the values stored in these models) then constitutes an "obtaining step" for obtaining these models in the meaning of the invention.

Figure 5:
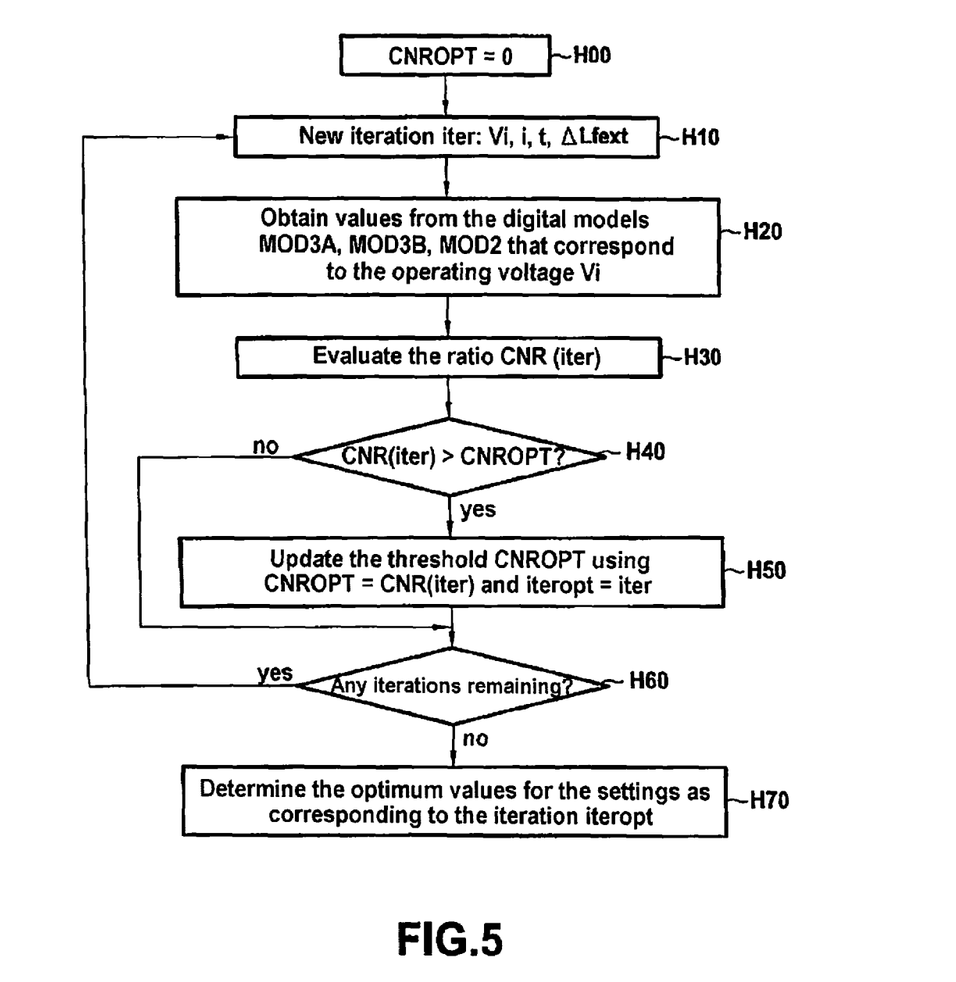
FIG. 5 is a flow chart showing the main steps performed during the step of estimating optimum settings as performed in the non-destructive inspection method shown in FIG. 3.

FIG. 5 shows the main steps performed by the estimator device 5 during the steps D10-1 of automatically estimating the optimum settings for the digital imaging system 3.

In accordance with the invention, the optimum settings for the digital imaging system 3 are estimated automatically by the estimator device 5 by optimizing the contrast-to-noise ratio of the digital images IM of the aviation part 2 as acquired by the digital imaging system 3. This optimization is carried out over a plurality of distinct values for the various settings, with the ranges over which the values of the settings are varied being configured beforehand in the estimator device 5 (e.g. via the input/output means 10).

Since each setting may take a plurality of distinct values, in the presently-described implementation, in order to optimize the contrast-to-noise ratio, the estimator device 5 performs a plurality of iterations scanning through all or some of these values (cf. step H10 of performing a new iteration and test step H60 for ending the iterative process). This plurality of iterations is performed by providing a plurality of loops (four loops in this example), that are nested in one another and by scanning through each of the various values of respective distinct settings, i.e. one loop scanning through operating voltage values, one loop scanning through current values, one loop scanning through exposure time values, and one loop scanning through external filter thickness values.

On each iteration iter corresponding to a value $V_i$ for the operating voltage, to a value $\underline{i}$ for the current applied to the source 3A, to the exposure time $\sqrt{t}$ for which the aviation part is exposed, and to a thickness $\Delta L_{fext}$ of the filter of the digital imaging system 3 (step H10), the estimator device 5 uses its obtaining modules 5A and 5B to access the digital models MOD3A, MOD3B, and MOD2 stored in the databases DB3A, DB3B, and DB2, respectively. More precisely, in this example the modules 5A and 5B extract from the databases DB3A, DB3B, and DB2 the values of the models that correspond to the value V. of the operating voltage of the source 3A (step H20), to the value of the angle of inclination of the anode of the source 3A, and to the thickness and to the type of the scintillator of the detector 3B.

On the basis of these extracted values, it then uses its evaluator module 5C to evaluate analytically a contrast-to-noise ratio written CNR for the current iteration iter, using the following expression (step H30):

$$CNR(iter) = \frac{S_{det}(V_i, L, \varepsilon) - S_{det}(V_i, L)}{\sqrt{S_{det}(V_i, L)}}$$

or alternatively using the following expression:

$$CNR(iter) = \frac{S_{det}(V_i, L, \varepsilon) + S_{det}(V_i, L)}{\sqrt{S_{det}(V_i, L) + S_{det}(V_i, L, \varepsilon)}}$$

where $S_{det}(V_i,L)$ or $S_{det}(V_i,L,\varepsilon)$ gives the value of the signal seen by the detector 3B of the digital imaging system 3 when a respective thickness L or L–ε of the aviation part 2 passes the beam of rays emitted by the source 3A. As mentioned above, this signal value represents a gray level seen by the detector 3B. In other words, the invention relies on a simple scalar calculation of the contrast-to-noise ratio CNR. This calculation depends on only one magnitude, specifically in this example a signal value that is representative of a gray level seen by the detector 3B and corresponding to a given thickness of the aviation part passing the beam of rays emitted by the source. This signal value depends solely on the thickness under consideration (for the settings applied to the imaging system, e.g. at constant $V_i$). The thickness ε is predetermined and corresponds to the thickness of an indicator being looked for during the non-destructive inspection of the aviation part 2. It should be observed that in the presently-described implementation, this thickness is a real number that, depending on the looked-for indicator, may either be positive or else negative, as described above. By way of example, such an indicator is extra thickness, insufficient thickness, pores, or indeed an inclusion. The thickness s is provided beforehand to the estimator device 5, e.g. by the operator of the digital imaging system 3 or by the operator of the non-destructive inspection device 4.

The signals taken into consideration while calculating the contrast-to-noise ratio are characterized by the physical parameters of the digital imaging system 3, in other words the real system.

More particularly, the signal values seen by the detector are obtained herein by the evaluator module 5C operating analytically with the following analytical expressions:

$$S_{det}(V_i, L) = \sum_j I_0(E_j, V_i) A(E_j, L) R(E_j)$$

and $$S_{det}(V_i, L, \varepsilon) = \sum_j I_0(E_j, V_i) A_\varepsilon(E_j, L, \varepsilon) R(E_j)$$

where:
$I_o(E_j,V_i)$ is the intensity of the photons present in a beam of rays emitted by the source 3A and of energy $E_j$ (corresponding to a wavelength $\lambda_j$) for the operating voltage $V_i$;
$A(E_j,L)$ and $A(E_j,L,\varepsilon)$ are attenuation factors to which the beam of rays of energy $E_j$ emitted by the source 3A is subjected; and
$R(E_j)$ is the spectral response of the detector for the energy $E_j$ (extracted from the model MOD3B during step H20).

The intensity $I_o(E_j,V_i)$ is calculated by the evaluator module 5C for j=1, . . . , N using the values extracted from the model MOD3A in step H20. More precisely, the evaluator module 5C calculates the value $I_o(E_j,V_i)$ using:

$$I_o(E_j,V_i) = i \cdot t \cdot I_{Os}(V_i,E_j)$$

where $I_{OS}(V_i,E_j)$ is extracted from the model MOD3A during said step H20, $\underline{i}$ is the value of the current applied to the source 3A corresponding to the current iteration iter, and $\underline{t}$ designates the exposure time of the aviation part 2 corresponding to the current iteration iter.

Furthermore, in the presently-described implementation, the evaluator module 5C evaluates the attenuation factor $A(E_j,L)$ as follows:

$$A(E_j,L) = A_{fint}(E_j,L_{fint}) A_{fext}(E_j,L_{fext}) A_{mat}(E_j,L)$$

where:
$A_{fint}(E_j,L_{fint})$ designates the attenuation to which the beam of rays of energy $E_j$ emitted by the source 3A is subjected by filtering that is inherent to the source 3A;
$A_{text}(E_j,L_{fext})$ designates the attenuation to which the beam of rays of energy $E_j$ emitted by the source 3A is subjected by filtering external to the source and corresponding to the thickness of the filter $\Delta L_{fext}$ corresponding to the current iteration iter; and
$A_{mat}(E_j,L)$ designates the attenuation to which the beam of rays of energy $E_j$ emitted by the source 3A is subjected by the material making up the aviation part 2.

The evaluator module 5C also evaluates the attenuation factor $A(E_j,L,\varepsilon)$ as follows:

$$A(E_j,L,\varepsilon) = A_{fint}(E_j,L_{fint}) A_{fext}(E_j,L_{fext}) A_{mat}(E_j,L-\varepsilon) A_{ind}(E_j,\varepsilon)$$

where $A_{ind}(E_j,\varepsilon)$ designates the attenuation to which the beam of rays of energy $E_j$ emitted by the source 3A is subjected by the looked-for indicator of thickness ε.

Each of the above-mentioned attenuations is modeled herein by filtering performed by a distinct material (a single element or multiple elements), namely the material constituting the filter that is inherent to the source 3A, the material constituting the filter external to the source 3A, the material of the aviation part 2, and the material corresponding to the looked-for indicator (which material may be a void, e.g. a pore).

In order to calculate these various attenuations, the evaluator module 5C uses the Beer Lambert's law, defined as follows:

$$A_l(L_l) = e^{-\mu_l(E_j)\rho_l L_l}$$

where:
- l designates an index taking values fint, fext, mat or ind depending on the attenuation under consideration;
- $\rho_l$ designates the density of the material associated with the attenuation under consideration;
- $L_l$ designates the thickness of the material associated with the attenuation under consideration (for the material of the aviation part 2, this thickness may be taken to be equal to L or to L−ε, and for the filter external to the source 3A, this thickness is taken to be equal to the value $\Delta L_{fext}$ corresponding to the current iteration iter); and
- $\mu_l(E_j)$ designates the mass attenuation coefficient of the material associated with the attenuation under consideration as a function of the energy $E_j$. For the material of the aviation part 2, this mass attenuation coefficient is obtained from the digital model MOD2 during step H20. For the other materials, it is assumed that their mass attenuation coefficients are supplied to the estimator device 5 at the same time as their densities are supplied.

Once the contrast-to-noise ratio CNR(iter) has been calculated by the evaluator module 5C for the current iteration iter, the determination module 5D of the estimator device 5 compares the ratio CNR(iter) with a threshold CNROPT (test step H40), which is initialized at 0 during a preliminary initialization step H00 performed before beginning the iterations.

If the contrast-to-noise ratio is greater than the current threshold CNROPT (response "yes" to test step H40), the threshold CNROPT is updated with the value of the ratio CNR(iter) (step H50). The current iteration iter is also stored in an indicator iteropt.

If the contrast-to-noise ratio is greater than the current threshold CNROPT (response "yes" to test step H40), the threshold CNROPT is kept unchanged.

Thereafter, the determination module 5D verifies whether all of the iterations have been performed (test step H60).

If there are any remaining iterations (response "yes" to test step H60), then a new iteration corresponding to new values for the settings $V_t$, i, t, and $\Delta L_{fext}$ is performed and the steps H20 to H60 are re-iterated for these new values.

Otherwise (response "no" to test step H60), the determination module 5D determines that the optimum values for the settings of the digital imaging system 3 correspond to the values of the settings tested during the iteration iteropt (step H70).

These optimum values are then supplied to the operator of the digital imaging system 3 in order to be applied to the digital imaging system 3 during the step D10-2.

It should be observed that the numerical examples given in the description are given purely by way of illustration. Naturally, other ranges of values could be envisaged, depending in particular on the digital imaging system 3 and on the aviation part 2 under consideration.

The invention thus provides an automatic process for determining automatically the optimum parameters for a digital imaging system such as a tomographic or X-ray system for acquiring images of an aviation part. It is appropriate to observe that although the invention is described with reference to an aviation part, it is applicable to other parts that are to be subjected to non-destructive inspection.

The invention claimed is:

1. A method of non-destructively inspecting an aviation part, the method comprising:
   a setting step for setting up a digital imaging system, said digital imaging system being a digital tomography or X-ray system having a source of electromagnetic rays and a detector suitable for detecting the electromagnetic rays emitted by the source;
   an acquisition step for acquiring at least one digital image of the aviation part by the digital tomography or X-ray system as set up; and
   an inspection step for non-destructively inspecting the aviation part by using said at least one acquired digital image; and
   a prior estimation step for estimating settings for the digital imaging system, the prior estimation step comprising:
   an obtaining step for obtaining a digital model characterizing the digital imaging system, said digital model comprising a model characterizing the source and a model characterizing the detector;
   an obtaining step for obtaining a digital model characterizing the aviation part;
   an evaluation step or evaluating a contrast-to-noise ratio as obtained by the digital imaging system on said aviation part for a plurality of distinct values of the settings, the evaluation step making use of the digital models that have been obtained characterizing the digital imaging system and the aviation part; and
   an automatic determination step for determining optimum values for the settings that optimize the contrast-to-noise ratio, the optimum values being applied to the digital imaging system during the setting step.

2. A method according to claim 1, wherein the contrast-to-noise ratio is evaluated, for said plurality of distinct values of the settings, from signals that are characterized by physical parameters of the digital imaging system.

3. A method according to claim 1, wherein the model characterizing the source and the model characterizing the detector provide energy responses as a function of wavelength respectively for the source and for the detector.

4. A method according to claim 1, wherein the settings of the system comprise at least one setting selected from:
   an operating voltage of the source of the digital imaging system;
   an exposure time for which the aviation part is exposed to a beam of rays emitted by the source of the digital imaging system;
   a value for current applied to the source of the digital imaging system; and
   a filter thickness applied in the digital imaging system to the source.

5. A method according to claim 1, wherein the model characterizing the source provides emission spectra of the source for different values for the operating voltage of the source.

6. A method according to claim 5, wherein the model characterizing the source also provides estimates for at least two half-value attenuation layers of the source for different values of the operating voltage of the source, said method comprising a validation step for validating the model characterizing the source by comparing the estimates for said at least two half-value attenuation layers of the source with experimental results.

7. A method according to claim 1, wherein the model characterizing the detector provides a spectral response of the detector to a beam of rays emitted by the source.

8. A method according to claim 7, further comprising a validation step for validating the model characterizing the detector, which validation step comprises:
   estimating at least one theoretical gray level seen by the detector for at least one given operating voltage of the source by using the model characterizing the source and the model characterizing the detector;
   obtaining a measurement of at least one gray level seen by the detector for said at least one given operating voltage of the source; and
   comparing said at least one estimated theoretical gray level with said at least one measured gray level.

9. A method according to claim 8, wherein obtaining the digital model characterizing the aviation part comprises:
   an obtaining step for obtaining a chemical composition of the material making up the part, said material being made up of at least one chemical element;
   for each chemical element making up the material, an obtaining step for obtaining a mass attenuation coefficient of that element for said different energy values; and
   a calculation step for calculating mass attenuation coefficients of the material for said different energy values from the mass attenuation coefficients of the elements making up the material for those different energies and from the proportions of those elements in the material.

10. A method according to claim 9, wherein the mass attenuation coefficient of each element of the material is obtained by consulting an NIST database.

11. A method according to claim 1, wherein the digital model characterizing the aviation part provides mass attenuation coefficients of the material making up the aviation part for different energy values of a beam of rays emitted by the source.

12. A method according to claim 1, wherein during the evaluation step, the contrast-to-noise ratio, written CNR, as obtained by the digital imaging system on said aviation part is evaluated for different values of the settings using the expression:

$$CNR = \frac{S_{det}(L, \varepsilon) - S_{det}(L)}{\sqrt{S_{det}(L)}}$$

or:

$$CNR = \frac{S_{det}(L, \varepsilon) + S_{det}(L)}{\sqrt{S_{det}(L) + S_{det}(L, \varepsilon)}}$$

where $S_{det}(L)$ and $S_{det}(L,\varepsilon)$ respectively designate a signal value seen by the detector of the digital imaging system when the beam of rays emitted by the source passes through a respective thickness L or L−ε of the aviation part, ε designating the thickness of an indicator that is looked for during the non-destructive inspection in the aviation part, said signal values being defined analytically by:

$$S_{det}(L) = \sum_j I_0(E_j, V) A(E_j, L) R(E_j)$$

and $$S_{det}(L, \varepsilon) = \sum_j I_0(E_j, V) A_\varepsilon(E_j, L, \varepsilon) R(E_j)$$

where:
$I_0(E_j,V)$ designates the intensity of the photons present in a beam of rays of energy $E_j$ emitted by the source and corresponding to a wavelength of $\lambda_j$, said intensity depending on the operating voltage V of the source, on the exposure time of the aviation part to the beam of rays emitted by the source, and on the current value applied to the source;
$A(E_j,L)$ designates an attenuation factor to which the beam of rays emitted by the source of energy $E_j$ is subjected, this attenuation factor depending on the mass attenuation coefficient of the material making up the aviation part and on the thickness L;
$A_\varepsilon(E_j,L,\varepsilon)$ designates an attenuation factor to which the beam of rays emitted by the source of energy $E_j$ is subjected, this attenuation factor depending on the mass attenuation coefficient of the material making up the aviation part, on its thickness L, and on the thickness ε of the indicator; and
$R(E_j)$ designates the spectral response of the detector as a function of the energy $E_j$.

13. A method according to claim 12, wherein:
the attenuation factor $A(E_j,L)$ is defined by:

$$A(E_j,L) = A_{fint}(E_j, L_{fint}) A_{fext}(E_j, L_{fext}) A_{mat}(E_j, L); \text{ and}$$

the attenuation factor $A(E_j,L,\varepsilon)$ is defined by:

$$A(E_j, L, \varepsilon) = A_{fint}(E_j, L_{fint}) A_{fext}(E_j, L_{fext}) A_{mat}(E_j, L-\varepsilon) A_{ind}(E_j, \varepsilon)$$

where $A_{fint}(E_j, L_{fint})$, $A_{fext}(E_j, L_{fext})$, and $A_{mat}(E_j, L-\varepsilon)$ designate respectively the attenuation to which the beam of rays emitted by the source of energy $E_j$ is subjected due to filtering inherent to the source, the attenuation to which the beam of rays emitted by the source of energy $E_j$ is subjected due to filtering external to the source, the attenuation to which the beam of rays emitted by the source of energy $E_j$ is subjected due to the material making up the aviation part, and the attenuation to which the beam of rays of energy $E_j$ emitted by the source is subjected in the presence of the looked-for indicator of thickness ε.

14. A method according to claim 1, wherein the estimation step comprises performing a plurality of iterations scanning through all or some of the plurality of distinct values of the settings, and during which the contrast-to-noise ratio is evaluated by accessing values of the digital models characterizing the source, the detector, and the aviation part as stored previously in the databases.

15. A system for non-destructively inspecting an aviation part, the system comprising:
   a digital imaging system, said digital imaging system being a digital tomography or X-ray system having a source of electromagnetic rays and a detector suitable for detecting the electromagnetic rays emitted by the source;
   a device for non-destructively inspecting the aviation part, the device being configured to use at least one digital image of the aviation part acquired by the digital imaging system; and an estimator device for estimating optimum values of settings for the digital imaging system, said optimum values of the settings being for applying to said digital imaging system prior to acquiring said at least one digital image of the aviation part while setting up the digital imaging system, said estimator device comprising:

a first obtaining module configured to obtain a digital model characterizing the digital imaging system, the digital model comprising a model characterizing the source and a model characterizing the detector;

a second obtaining module configured to obtain a digital model characterizing the aviation part;

an evaluation module configured to evaluate a contrast-to-noise ratio as obtained by the digital imaging system on said aviation part for a plurality of distinct values of the settings, this evaluation module making use of the digital models that have been obtained characterizing the digital imaging system and the aviation part; and an automatic determination module, configured to determine automatically optimum values of the settings that optimize the contrast-to-noise ratio.

* * * * *